J. M. GRAY.
FASTENER FOR CAR DOORS.
APPLICATION FILED JULY 1, 1914.
1,145,987.
Patented July 13, 1915.
2 SHEETS—SHEET 1.
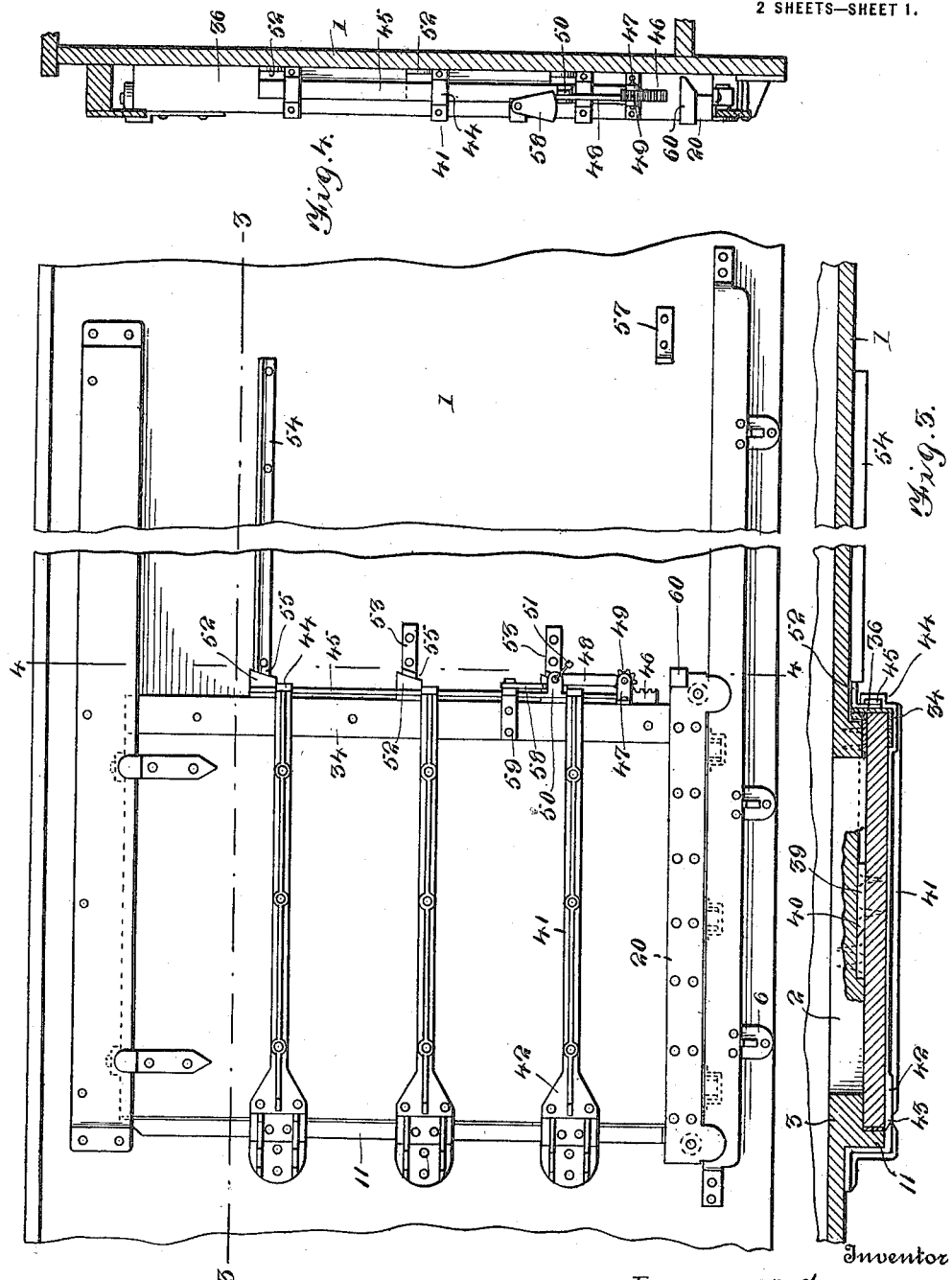
Witnesses
E. R. Ruppert
J. W. Garner
Inventor
James M. Gray
By Victor J. Evans
Attorney

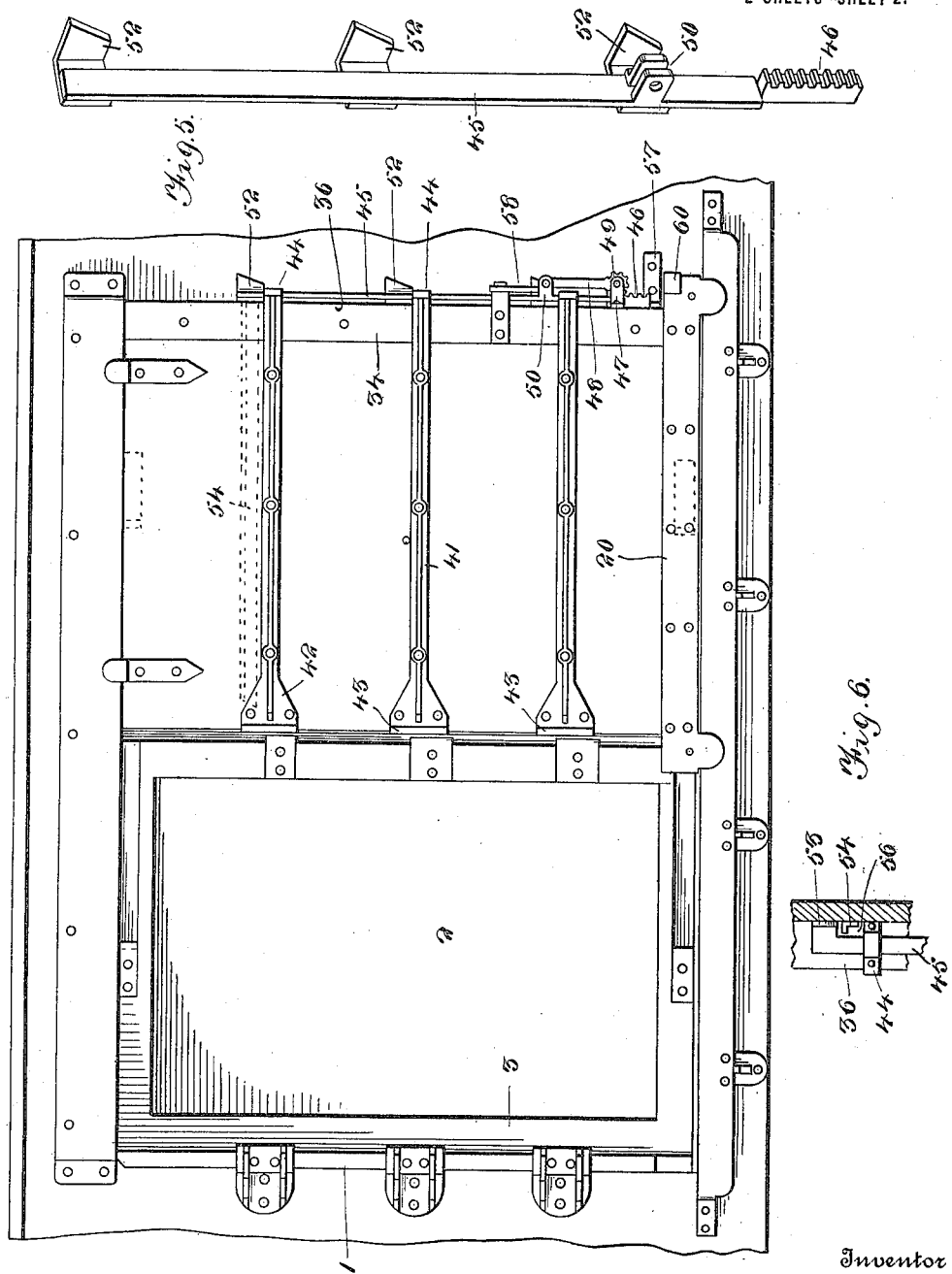

UNITED STATES PATENT OFFICE.

JAMES M. GRAY, OF ATLANTA, GEORGIA.

FASTENER FOR CAR-DOORS.

1,145,987.    Specification of Letters Patent.    Patented July 13, 1915.

Application filed July 1, 1914. Serial No. 848,428.

*To all whom it may concern:*

Be it known that I, JAMES M. GRAY, a citizen of the United States, residing at Atlanta, in the county of Fulton and State of Georgia, have invented new and useful Improvements in Fasteners for Car-Doors, of which the following is a specification.

This invention relates to improvements in locking means for the sliding door for a freight car to secure the same in closed position and also in open position; the invention also relating to the provision of improved means for closely wedging the door when in closed position and for drawing the door closely against the outer side of the door frame so as to close the cracks around the door and prevent loss of material, such as grain or the like in bulk from the car.

The invention consists in the construction, combination and arrangement of devices hereinafter described and claimed.

In the accompanying drawings, Figure 1 is a side elevation of a portion of a wall of a freight car provided with an improved car door and door hanging and securing means constructed in accordance with my invention and showing the door in closed and locked position. Fig. 2 is a similar view of the same, showing the door in open position. Fig. 3 is a horizontal sectional view taken on the plane indicated by the line 3—3 of Fig. 1. Fig. 4 is a vertical sectional view taken on the plane indicated by the line 4—4 of Fig. 1. Fig. 5 is a detail perspective view of the locking bar. Fig. 6 is a detail outer edge view of the door.

For the purposes of this specification a car wall is indicated at 1, provided with a door opening 2 around the sides of which, and on the outer side of the wall, is a door frame 3. On the outer side of the door are reinforcing bars 41 appropriately spaced apart and cross sectionally T-shaped. The opposite ends of the reinforcing bars 41 extend across the outer edge of the door and are provided with clips 44. A vertically movable locking bar 45 is arranged to operate in the said clips, the latter forming guides for said locking bar. The lower portion of the locking bar is formed with a rack 46 which operates between a pair of brackets 47 that are secured on the outer edge of the door and between the said brackets there is mounted an operating lever 48 which has a pinion 49 at its pivotal end and which pinion engages the rack 46. Hence the locking bar may be raised and lowered by the turning of the lever 48 to cause the rack and pinion to coact and when the lever is raised to lower the locking bar its upper end passes between a pair of spaced lugs 50 with which the locking bar is provided, the said lugs and the lever having alining openings through which a sealing strip 51 or other suitable locking or securing device may be passed. If it is desired to use a lock to secure the lever in such position the shackle thereof may be passed through said openings.

The locking bar is provided with locking lugs 52 which are wedge shaped and which coact with locking plates 53 and a lock rail 54 to lock the door in closed position. The lock plates and lock rail are secured on the wall of the car as shown and have beveled inner ends 55 which coact with the wedge shaped locking lugs 52 of the locking bar to secure the door in closed position, when the said locking lugs drop in front of said plates and rail, and owing to the beveled edges or inclined edges of said plates, rail and locking lugs, the locking bar when thus arranged firmly wedges the door in closed position and against the stop bar 11.

The bar 37 and the web 36 of the bar 34 are provided with notches or recesses 56 to clear the locking plates 53 and locking rail 54, and when the locking bar 45 is raised so that its locking lugs 52 are higher than said plates and rail the door may be then opened and may be moved until it engages a stop 57 which is secured on the car wall at a suitable distance from the door opening. The rail 54 bears under the uppermost lug 52 when the door is being opened, said lug sliding on said rail and when the door reaches fully opened position said uppermost lug clears and drops from the outer end of said rail, thereby permitting the locking bar to drop behind the outer end of said rail and thereby firmly secure the door in opened position. A gravity catch 58 is provided, which is pivotally mounted on the outer edge of the door as at 59 and which is adapted to drop to a position above the lugs 50 of the locking bar to secure the latter in lowered, locking position, either when the door is open or when it is closed. The bar 20 at the lower side of the door is provided at one end with a stop 60 which limits the extent of downward movement of the lever 48.

Having thus described my invention, I claim:—

1. In a structure of the class described the combination of a wall having a door opening and a stop device at one side of the door opening, a slidable mounted door movable across the door opening, a vertically movable locking bar carried by the door and provided with wedge-shaped lugs, and locking devices on the wall, spaced from one side of the door opening and arranged to coact with the wedge-shaped lugs of the locking bar to secure the door in closed position and to also firmly wedge the door against the said stop device.

2. In a structure of the class described the combination of a wall having a door opening and a stop device at one side of the door opening, a slidably mounted door movable across the door opening, a vertically movable locking bar carried by the door and provided with wedge-shaped lugs, and locking devices on the wall, spaced from one side of the door opening and arranged to coact with the wedge-shaped lugs of the locking bar to secure the door in closed position and to also firmly wedge the door against the said stop device, one of said locking devices on the wall being a rail which also coacts with one of the lugs of the locking bar to hold the latter in raised position while the door is being moved.

3. In a structure of the class described the combination of a wall having a door opening and a stop device at one side of the door opening, a slidably mounted door movable across the door opening, a vertically movable locking bar carried by the door and provided with wedge-shaped lugs, and locking devices on the wall, spaced from one side of the door opening and arranged to coact with the wedge-shaped lugs of the locking bar to secure the door in closed position and to also firmly wedge the door against the said stop device, one of said locking devices on the wall being a rail which also coacts with one of the lugs of the locking bar to hold the latter in raised position while the door is being moved, the length of said rail being such that when the door is fully opened said lug clears and drops in front of the outer end of said rail and coacts therewith to lock the door in open position.

4. In a structure of the class described the combination of a wall having a door opening and also having a fixed locking device, a door mounted for sliding movement across the door opening, a locking bar mounted for vertical movement on the outer edge of the door and having means to coact with said fixed locking device on the wall to lock the door in closed position, said locking bar having a rack, a pinion engaging the rack and mounted in bearings on the door, and a lever to actuate said pinion to raise or lower said locking bar.

5. In a structure of the class described the combination of a wall having a door opening and also having a fixed locking device, a door mounted for sliding movement across the door opening, a locking bar mounted for vertical movement on the outer edge of the door and having means to coact with said fixed locking device on the wall to lock the door in closed position, said locking bar having a rack, a pinion engaging the rack and mounted in bearings on the door, and a lever to actuate said pinion to raise or lower said locking bar, a locking bar also having a pair of spaced lugs between which the upper end of the lever moves when the locking bar is lowered, said lugs and bar having coincident openings to receive a sealing device.

6. In a structure of the class described the combination of a wall having a door opening and also having a fixed locking device, a door mounted for sliding movement across the door opening, a locking bar mounted for vertical movement on the outer edge of the door and having means to coact with said fixed locking device on the wall to lock the door in closed position, said locking bar having a rack, a pinion engaging the rack and mounted in bearings on the door, and a lever to actuate said pinion to raise or lower said locking bar, a locking bar also having a pair of spaced lugs between which the upper end of the lever moves when the locking bar is lowered, said lugs and bar having coincident openings to receive a sealing device, and a gravitating catch carried by the door and adapted to close above the lugs to prevent casual lifting of the locking bar.

In testimony whereof I affix my signature in presence of two witnesses.

JAMES M. GRAY.

Witnesses:
J. W. GARNER,
BENNETT S. JONES.